UNITED STATES PATENT OFFICE.

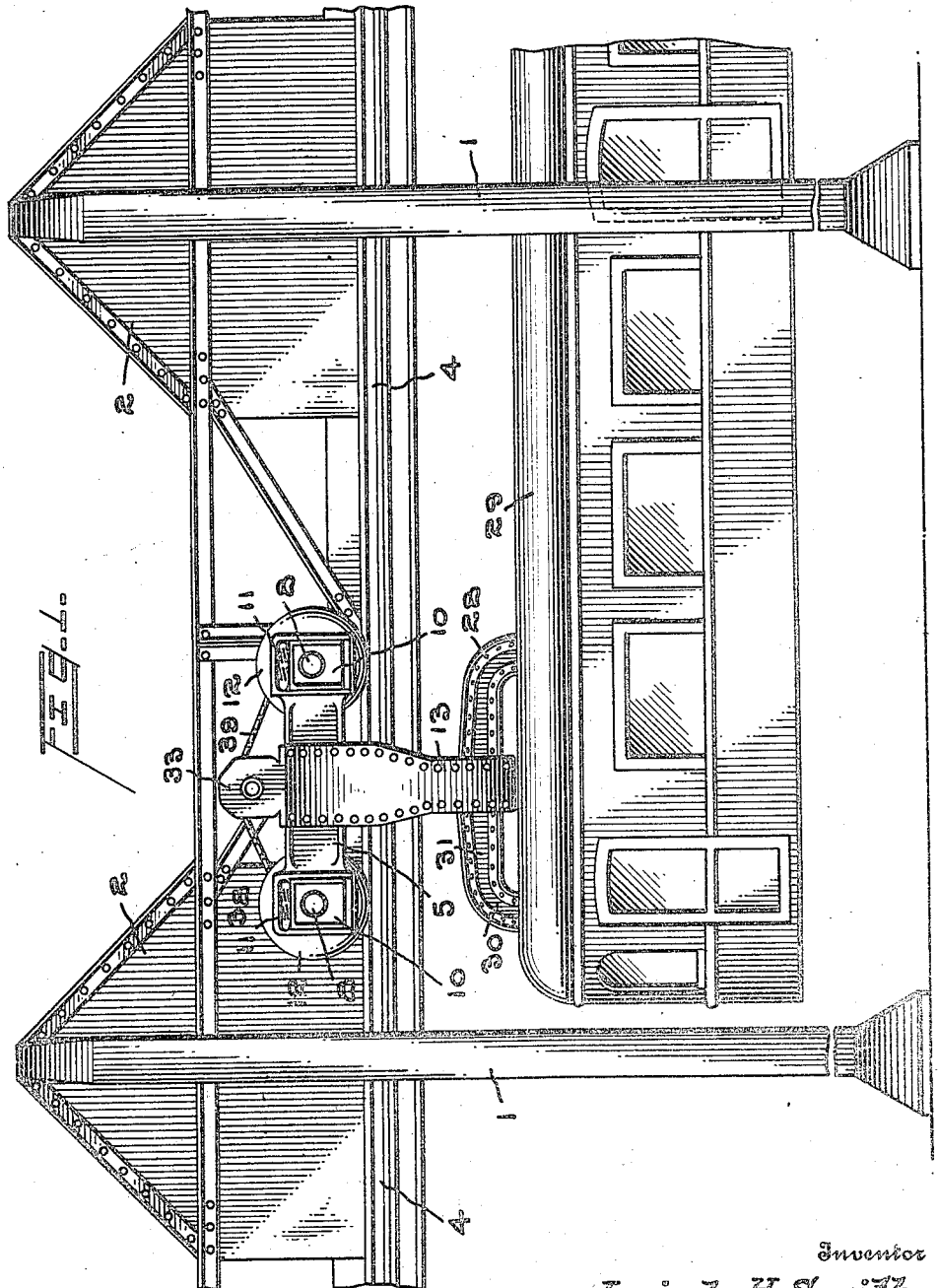

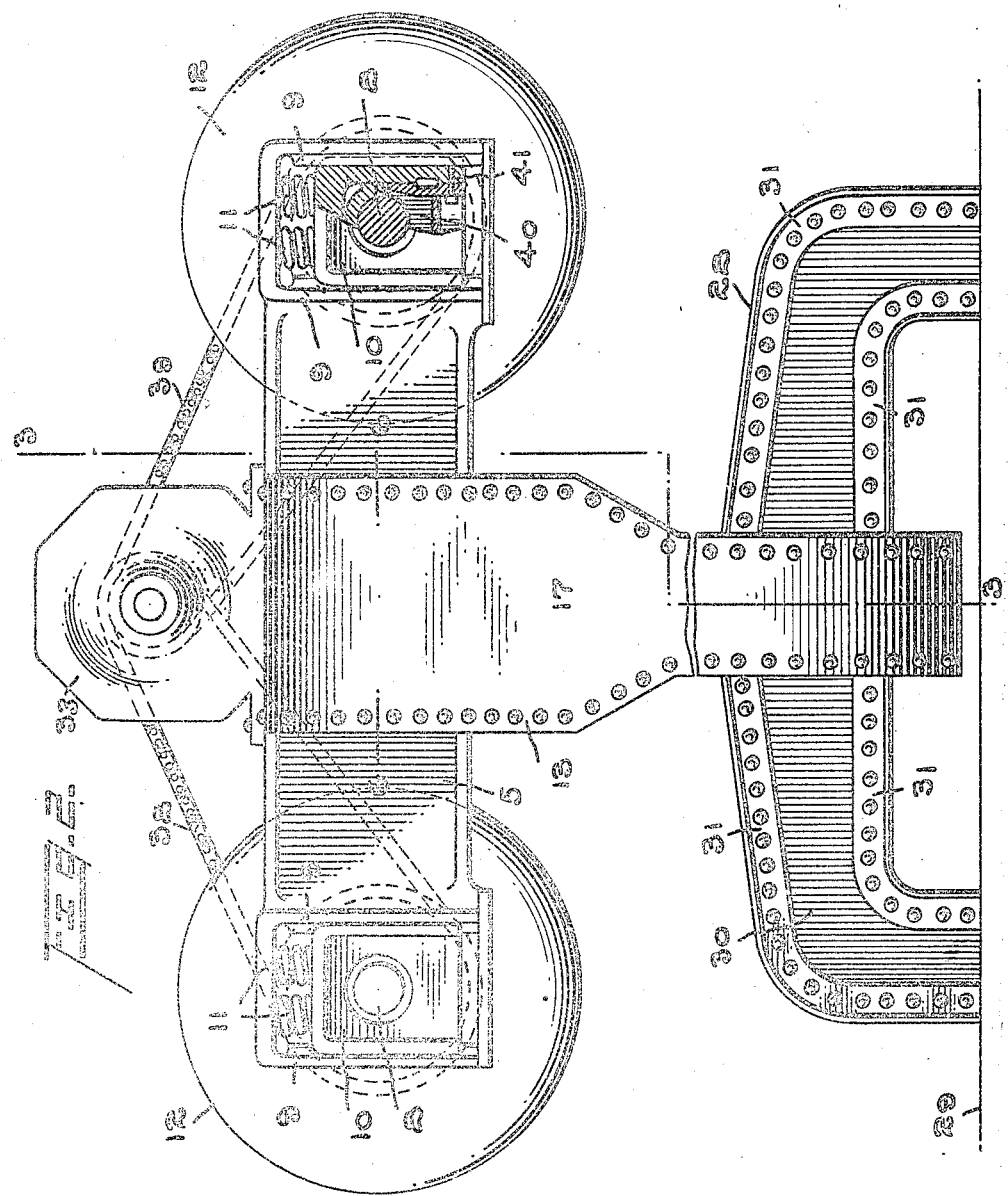

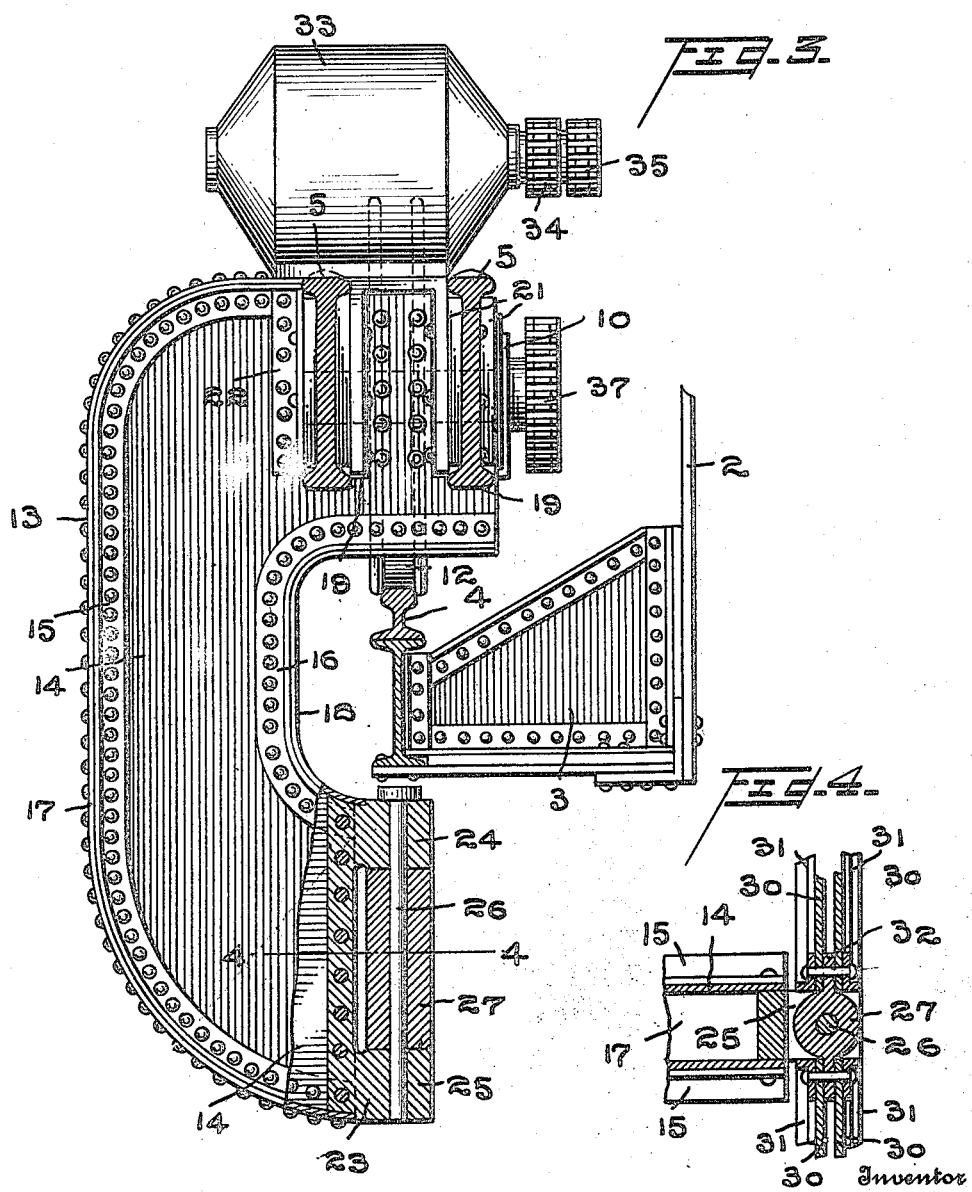

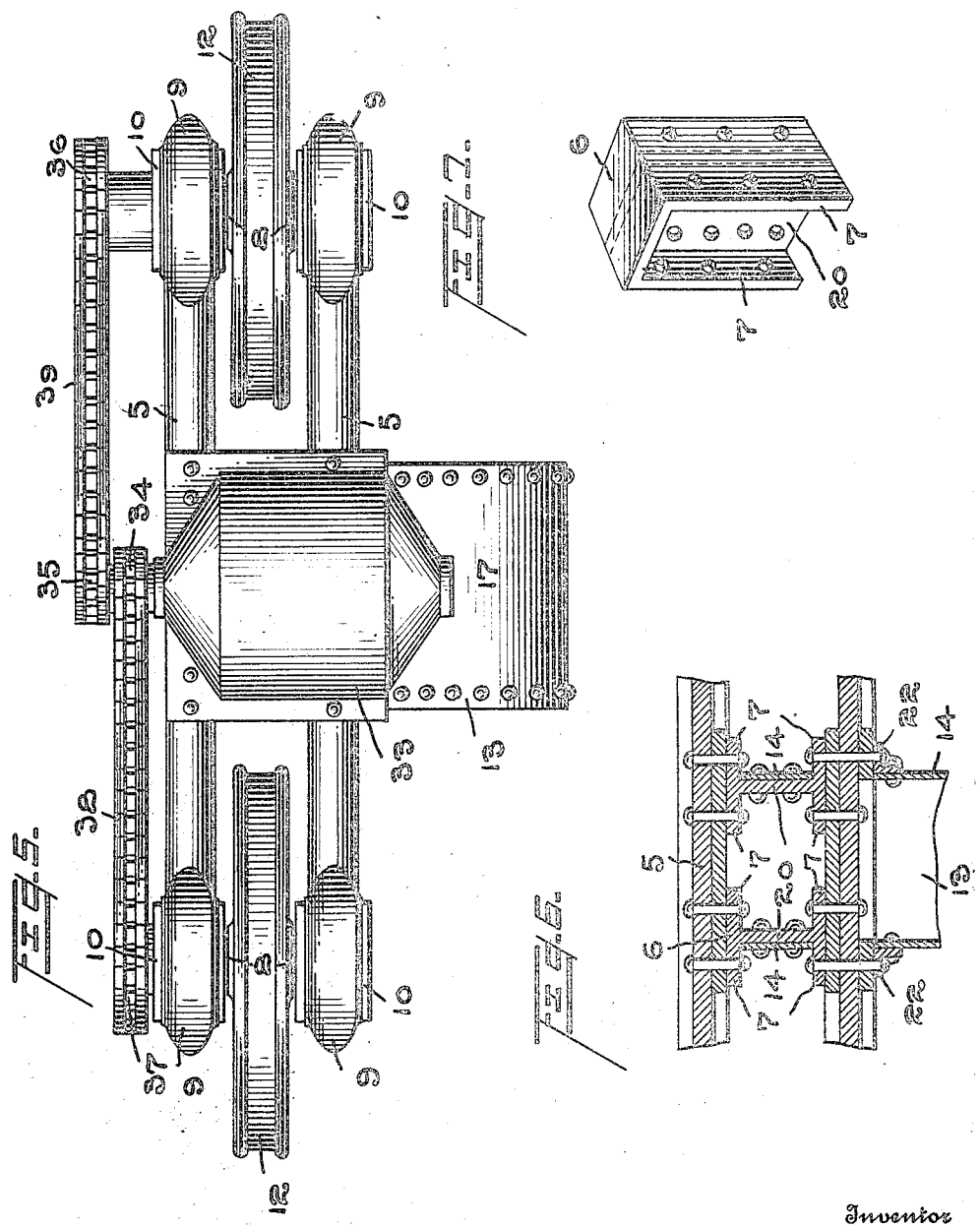

JOSIAH H. SMITH, OF PHILADELPHIA, PENNSYLVANIA, ASSIGNOR TO WILLIAM H. TIGERMAN, OF PHILADELPHIA, PENNSYLVANIA.

TRUCK.

1,151,729.  Specification of Letters Patent.  Patented Aug. 31, 1915.

Application filed January 20, 1915. Serial No. 3,293.

*To all whom it may concern:*

Be it known that I, JOSIAH H. SMITH, a citizen of the United States, residing at Philadelphia, in the county of Philadelphia and State of Pennsylvania, have invented certain new and useful Improvements in Trucks, of which the following is a specification.

My invention relates to improvements in trucks. and more particularly to trucks designed for supporting the cars of suspension railways of the monorail system, the object of the invention being to provide a truck of the character stated having an arched hanger rigidly secured to the side frames of the truck, and providing a pivotal mounting for the arched beam of a car frame.

A further object is to provide a truck of the character stated which is adapted to support an electric motor driving both wheels of the truck by sprocket chains, and supporting the car at its pivotal connection in vertical alinement with the center of the truck, so as to support the greatest weight at the point of greatest strength.

A further object is to provide a truck of the character stated which permits of the necessary pivotal movement to allow the truck to take the curves of the rail, yet rigidly support the car against vertical movement.

With these and other objects in view, the invention consists in certain novel features of construction and combinations and arrangements of parts as will be more fully hereinafter described and pointed out in the claims.

In the accompanying drawings, Figure 1 is a fragmentary view in side elevation illustrating my improvements. Fig. 2 is a view in side elevation of the truck showing a portion of one end broken away to illustrate the construction of bearing box. Fig. 3 is a view in transverse section on the line 3—3 of Fig. 2. Fig. 4 is a fragmentary view in section on the line 4—4 of Fig. 3. Fig. 5 is a top plan view of the truck. Fig. 6 is a fragmentary view in longitudinal horizontal section through the central portion of the truck on the line 6—6 of Fig. 2, and Fig. 7 is a perspective view of one of the blocks 6.

1 represents uprights or standards supporting an elevated structure 2. from which, at regular intervals, cantilevers 3 project and support a rail 4.

5, 5, represent the parallel side frames of my improved truck. These side frames are preferably castings connected at opposite sides of their centers by web blocks 6, the side flanges 7 of which being securely riveted to the side frames 5. The ends of the side frames 5 are provided with forks 9, in which bearing blocks 10 are mounted to slide, and coiled springs 11 are positioned between the upper ends of the bearing blocks and the upper ends of the yokes.

The bearing blocks 10 receive axles 8 carried by wheels 12, said wheels located between the side frames, and adapted to run upon the rail 4. A depending arched hanger 13 is rigidly secured to and forms a fixed part of my improved truck as will now be described.

The hanger 13 is composed of a pair of side plates 14 of general arch shape, having angle bars 15 and 16 at their edges, which are riveted to the side plates, and also to outer and inner plates 17 and 18 respectively so that the hanger constitutes in effect, a box structure, and is preferably widest at its upper portion as shown clearly in Figs. 1 and 2, and reduces appreciably in width at its lower portion, although this difference in width may be varied as may be desired.

The side plates 14 of the hanger 13, at their upper ends, are recessed as shown at 19 to accommodate the side frames 5 of the truck, but between said recessed portions 19, the side plates 14 are securely riveted to the center web 20 of the blocks 6.

The filler blocks 21 are positioned at the sides of the side frames 5, and strengthening angles 22 connect the side plates 14 with the side frames 5. The side frames 5 are preferably in the shape of I-beams for strength, but the invention is, of course, not limited to the particular shape employed.

In the lower end of the hanger 13, a casting 23 is securely riveted. This casting has perforated integral ears 24 and 25 spaced apart and constituting bearings for a king pin 26 which is projected through a bearing sleeve 27 secured to and forming part of an arched girder 28. This girder 28 extends upwardly from, and is rigidly secured to the car 29, and as shown clearly in Figs. 2 and 4, consists of parallel side plates 30, strengthened by angles 31 at their edges, and said angles and side plates secured to lateral flanges 32 on the bearing sleeve 27.

It will be noted that the casting 23 is so shaped that bearing sleeve 27 is free to turn within certain limits, so that the truck will be given the necessary pivotal movement to accommodate itself to the shape of the rail 4.

It will be noted, particularly by reference to Figs. 2 and 3, that the bearing 27 is in vertical alinement with the center of the truck, both longitudinally and transversely of the truck, so that the strain is sustained at the point of greatest strength and the weight is evenly distributed throughout the truck.

On top of the truck, at its center, I support an electric motor 33 driving a pair of sprocket wheels 34 and 35 respectively. On the axles 8, I provide sprocket wheels 36 and 37 respectively, and connect the sprocket wheel 34 with sprocket wheel 37 by means of an endless chain 38. I also connect the sprocket wheel 35 with the sprocket wheel 36 by means of an endless chain 39, so that both axles are positively driven by the electric motor.

As seen clearly in Fig. 2, I provide the bearing boxes 10 with removable lubricant or waste boxes 40, secured in place by bolts 41 and adapted to be moved into and out of the bottom of the bearing boxes as occasion may require.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a car having an arched girder, of a truck having an arched hanger pivotally connected to and supporting the girder, substantially as described.

2. The combination with a car having an arched girder, of a truck having an arched hanger pivotally connected to and supporting the girder, said arched hanger projecting laterally from the center of the truck, substantially as described.

3. The combination with a car having an arched girder, of a truck having an arched hanger pivotally connected to and supporting the girder, said arched hanger projecting laterally from the center of the truck, and said pivotal connection located in vertical alinement with the center of the truck, substantially as described.

4. The combination with a car having an arched girder, of a truck, wheels at the ends of the truck, an arched hanger fixed to the truck and pivotally connected at its lower end to the arched beam, a motor on the truck, and driving means connecting the motor with both wheels of the truck, substantially as described.

5. In a truck, the combination with a pair of side frames, wheels supporting the ends of the side frames, blocks between the side frames secured to the side frames, a hollow arched hanger, the side plates of which having recesses therein to receive the side frames and between the side frames secured to said blocks, and means at the lower end of said hanger for supporting a car, substantially as described.

6. In a truck, the combination with a pair of side frames, wheels supporting the ends of the side frames, blocks between the side frames secured to the side frames, a hollow arched hanger, the side plates of which having recesses therein to receive the side frames and between the side frames secured to said blocks, a casting secured to the lower end of the hanger and having bearings spaced apart, a car, and an arched beam on the car pivotally supported between the bearings, substantially as described.

7. In a truck, the combination with a pair of side frames, wheels supporting the ends of the side frames, blocks between the side frames secured to the side frames, a hollow arched hanger, the side plates of which having recesses therein to receive the side frames and between the side frames secured to said blocks, a casting secured to the lower end of the hanger and having bearings spaced apart, a car, an arched beam on the car having a bearing between its ends located between the bearings of the hanger, and a king pin in all of said bearings, substantially as described.

8. In a truck, the combination with a pair of side frames, wheels supporting the ends of the side frames, blocks between the side frames secured to the side frames, a hollow arched hanger, the side plates of which having recesses therein to receive the side frames and between the side frames secured to said blocks, a casting secured to the lower end of the hanger and having bearings spaced apart, a car, an arched girder secured to the car, a bearing sleeve located at the center of the arched girder and having lateral flanges secured to the arched girder, said bearing sleeve located between the bearings of the hanger, and a vertically movable king pin positioned in the said bearings, substantially as described.

9. In a truck, the combination with a pair of side frames, wheels supporting the ends of the side frames, blocks between the side frames secured to the side frames, a hollow arched hanger, the side plates of which having recesses therein to receive the side frames and between the side frames secured to said blocks, a casting secured to the lower end of the hanger and having bearings spaced apart, a car, an arched beam on the car pivotally supported between the bearings, said bearings located below and in vertical alinement with the longitudinal and transverse center of the truck, substantially as described.

10. In a truck, the combination with a pair of side frames, wheels supporting the ends of the side frames, blocks between the side frames secured to the side frames, a hollow arched hanger, the side plates of which having recesses therein to receive the side frames and between the side frames secured to said blocks, a casting secured to the lower end of the hanger and having bearings spaced apart, a car, an arched beam on the car having a bearing between its ends located between the bearings of the hanger, a king pin in all of said bearings, said bearings located below and in vertical alinement with the longitudinal and transverse center of the truck, substantially as described.

11. In a truck, the combination with a pair of side frames, wheels supporting the ends of the side frames, blocks between the side frames secured to the side frames, a hollow arched hanger, the side plates of which having recesses therein to receive the side frames and between the side frames secured to said blocks, a casting secured to the lower end of the hanger and having bearings spaced apart, a car, an arched girder secured to the car, a bearing sleeve located at the center of the arched girder and having lateral flanges secured to the arched girder, said bearing sleeve located between the bearings of the hanger, a vertically movable king pin positioned in the said bearings, said bearings located below and in vertical alinement with the longitudinal and transverse center of the truck, substantially as described.

In testimony whereof I have signed my name to this specification in the presence of two subscribing witnesses.

JOSIAH H. SMITH.

Witnesses:
CHAS. E. POTTS,
S. W. FOSTER.